(12) United States Patent
Chen

(10) Patent No.: US 6,892,761 B2
(45) Date of Patent: May 17, 2005

(54) HOT/COLD WATER INLET AND OUTLET STRUCTURE FOR CERAMIC CORE SHAFT OF SINGLE HANDLED FAUCET

(75) Inventor: Mei Li Chen, Taichung Hsien (TW)

(73) Assignee: Kuching International Ltd., Taichung Hsien (TW)

( * ) Notice: Subject to any disclaimer, the term of this patent is extended or adjusted under 35 U.S.C. 154(b) by 146 days.

(21) Appl. No.: 10/464,490

(22) Filed: Jun. 19, 2003

(65) Prior Publication Data

US 2004/0256011 A1 Dec. 23, 2004

(51) Int. Cl.$^7$ ............................................. F16K 11/078
(52) U.S. Cl. ................................................. 137/625.4
(58) Field of Search .......................... 137/625.4, 625.41

(56) References Cited

U.S. PATENT DOCUMENTS

| | | | | |
|---|---|---|---|---|
| 3,965,936 A | * | 6/1976 | Lyon | 137/625.17 |
| 4,502,507 A | * | 3/1985 | Hayman | 137/625.4 |
| 4,687,025 A | * | 8/1987 | Kahle et al. | 137/625.17 |
| 5,060,692 A | * | 10/1991 | Pawelzik et al. | 137/625.4 |
| 5,417,242 A | * | 5/1995 | Goncze | 137/625.17 |
| 5,518,027 A | * | 5/1996 | Saiki et al. | 137/550 |

* cited by examiner

*Primary Examiner*—John Fox
(74) *Attorney, Agent, or Firm*—Harrison & Egbert

(57) ABSTRACT

A hot/cold water inlet and outlet structure for a ceramic core shaft of a single handled faucet has a valve housing, a switch valve set, a valve mount, an upper switch valve, a lower switch valve, and a sealing ring wherein the valve housing has a valve chamber disposed at the interior thereof for the switch valve set and the valve mount thereof to be adapted therein respectively. The upper switch valve has a regulating recess defined at the bottom thereof; the lower switch valve includes a pair of arc hot/cold water inlet holes and a water outlet hole with indented groove seats defined thereon, correspondingly matched to arc hot/cold water inlet passages and a water outlet passage with higher protruded walls of the valve mount thereof; whereby, the lower switch valve is overlapped on top of the valve mount with the indented groove seats thereof securely joined to the higher protruded walls thereof in sealing engagement, further pressing downwards the sealing ring adapted at the valve mount therein to effectively prevent the leakage of water in use and ensure the precise engagement of the lower switch valve with the valve mount thereof.

1 Claim, 3 Drawing Sheets

HOT/COLD WATER INLET AND OUTLET STRUCTURE FOR CERAMIC CORE SHAFT OF SINGLE HANDLED FAUCET

BACKGROUND OF THE INVENTION

The present invention is related to a hot/cold water inlet and outlet structure for a ceramic core shaft of a single handled faucet, comprising a valve housing, a switch valve set, a valve mount, an upper switch valve, a lower switch valve, and a sealing ring wherein the valve housing has a valve chamber disposed at the interior thereof for the switch valve set and the valve mount thereof to be adapted therein respectively. The upper switch valve has a regulating recess defined at the bottom thereof; the lower switch valve includes a pair of arc hot/cold water inlet holes and a water outlet hole with indented groove seats defined thereon, correspondingly matched to arc hot/cold water inlet passages and a water outlet passage with higher protruded walls of the valve mount thereof; whereby, the lower switch valve is overlapped on top of the valve mount with the indented groove seats thereof securely joined to the higher protruded walls thereof in sealing engagement, further pressing downwards the sealing ring adapted at the valve mount therein to effectively prevent water leakage in use and ensure the precise engagement of the lower switch valve with the valve mount thereof Please refer to FIGS. 1, 2. A conventional ceramic core shaft of a single handled faucet is mainly made up of a valve housing 10, a switch valve set 20, a valve mount 30, an upper switch valve 31, a lower switch valve 32, and a sealing ring 33. The valve housing 10 has a valve chamber 11 disposed at the interior thereof for the switch valve set 20 and the base mount 30 to be adapted therein. The switch valve set 20 is equipped with a control stick seat 21 with a turning protruded block 211 disposed at the upper section thereof, and a support seat 22 with a turning cut area 221 and a switch valve 23 disposed at the lower section sequentially correspondingly matched to the valve mount 30 thereof. The upper switch valve 31 has a regulating recess 311 defined at the bottom thereof, and the lower switch valve 32 is provided with a flat bottom with a pair of arc hot/cold water inlet holes 321, 322 and a water outlet hole 323 disposed thereon, correspondingly matched to arc hot/cold water inlet passages 301, 302 and a water outlet passage 303 of the valve mount 30 thereof. The arc hot/cold water inlet passages 301, 302 and the water outlet passage 303 thereof are defined by protruded rib walls 3011, 3021, 3031, each extending upwards at the periphery thereof respectively, which are further circumscribed by a stop wall 304 of the same height at the outside thereof with a channel groove 305 formed therein for the sealing ring 33 to be adapted thereto and abutted against the lower switch valve 32 thereof.

There are some drawbacks to such conventional ceramic core shaft of a single handled faucet. Most of all, the protruded rib walls 3011, 3021, 3031 and the stop wall 304 thereof, designed in the same height, makes the valve mount 30 only abut against the flat bottom of the lower switch valve 32 when overlapped thereon in assembly and the sealing ring 33 simply adapt at the valve mount 30 therein without precise engagement, which may reduce the function of the sealing ring 33 and cause the leakage of water in use.

SUMMARY OF THE PRESENT INVENTION

It is, therefore, the primary purpose of the present invention to provide a hot/cold water inlet and outlet structure for a ceramic core shaft of a single handled faucet, comprising a valve housing, a switch valve set, a valve mount, an upper switch valve, a lower switch valve, and a sealing ring wherein the lower switch valve has a pair of arc hot/cold water inlet holes and a water outlet hole with indented groove seats defined thereon, correspondingly matched to arc hot/cold water inlet passages and a water outlet passage with higher protruded walls of the valve mount thereof; whereby, when the lower switch valve is overlapped on top of the valve mount in assembly, the indented groove seats thereof are securely joined to the higher protruded walls thereof in sealing engagement, further pressing downwards the sealing ring adapted at the valve mount therein to effectively prevent water leakage in use and ensure the precise engagement of the lower switch valve with the valve mount thereof.

DETAILED DESCRIPTION OF THE PREFERRED EMBODIMENTS

Figure 3:
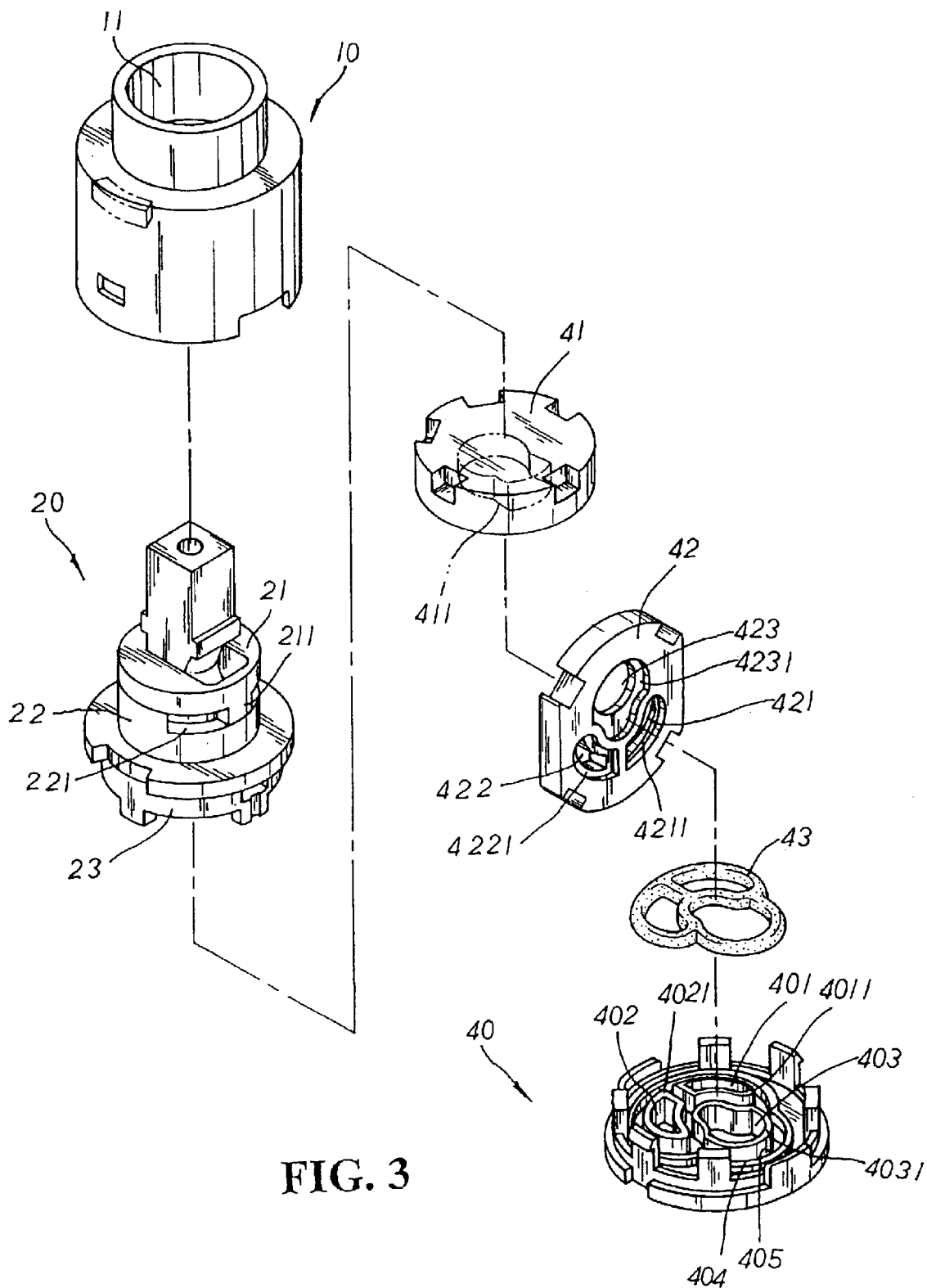
FIG. 3 is a perspective exploded view of the present invention.

Please refer to FIG. 3. The present invention is related to a hot/cold water inlet and outlet structure for a ceramic core shaft of a single handled faucet, comprising a valve housing 10, a switch valve set 20, a valve mount 40, an upper switch valve 41, a lower switch valve 42, and a sealing ring 43. The valve housing 10 has a valve chamber 11 disposed at the interior thereof for the switch valve set 20 and the valve mount 40 thereof to be adapted therein respectively. The switch valve set 20 is made up of a control stick seat 21 with a turning protruded block 211 disposed at the upper section thereof, a support seat with a turning cut area 221 disposed beneath the control stick seat 21 thereof, and a switch valve 23 disposed at the bottom thereof correspondingly matched to the valve mount 40 thereof.

The upper switch valve 41 has a regulating recess 411 defined at the bottom thereof, and the lower switch valve 42 is provided with a pair of arc hot/cold water inlet holes 421, 422 and a water outlet hole 423 thereon, correspondingly matched to arc hot/cold water inlet passages 401, 402 and a water outlet passage 403 of the valve mount 40 thereof. The periphery of the arc hot/cold water inlet holes 421, 422 and the water outlet hole 423 of the lower switch valve 42 thereof are defined by indented groove seats 4211, 4221, 4231 respectively, correspondingly matched to higher protruded walls 4011, 4021, 4031 defining the arc hot/cold water inlet passages 401, 402 and the water outlet passage 403 of the valve mount 40 thereof respectively. The higher protruded walls 4011, 4021, 4031 thereof are circumscribed by a lower stop wall 404 extending upwards at the outside thereof to form a channel groove 405 therein for the sealing ring 43 of the same shape to be adapted in sleeve engagement therein.

Figure 1:
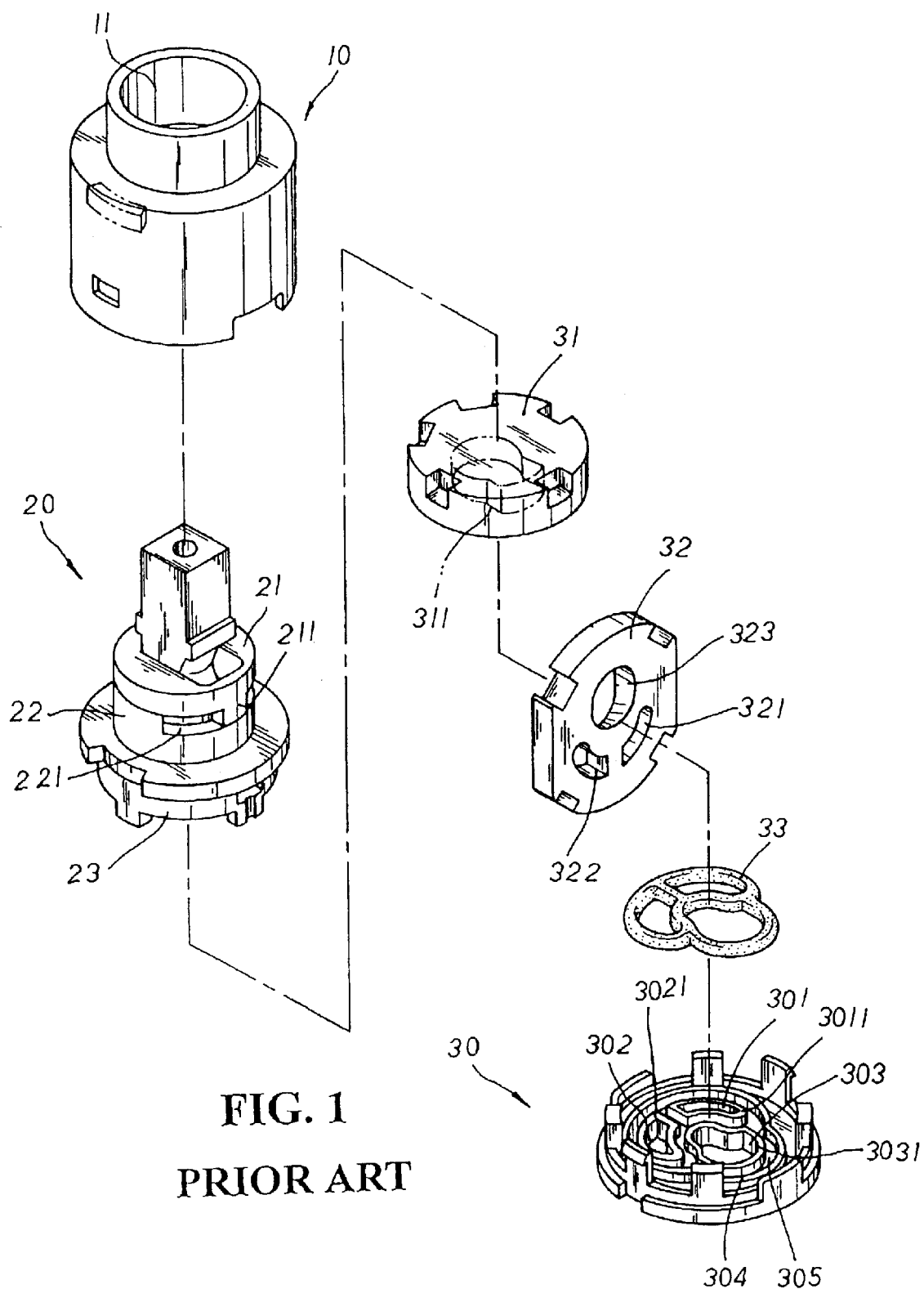
FIG. 1 is a perspective exploded view of a conventional ceramic core shaft of a singled handle faucet.
Figure 4:
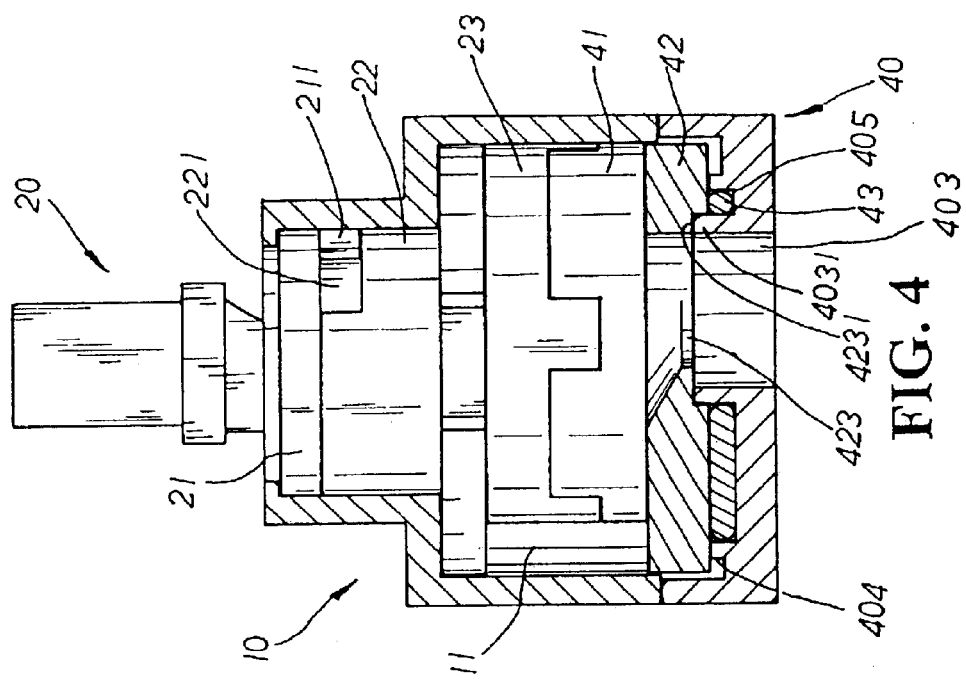
FIG. 4 is a cross sectional view of the present invention in assembly.
Figure 2:
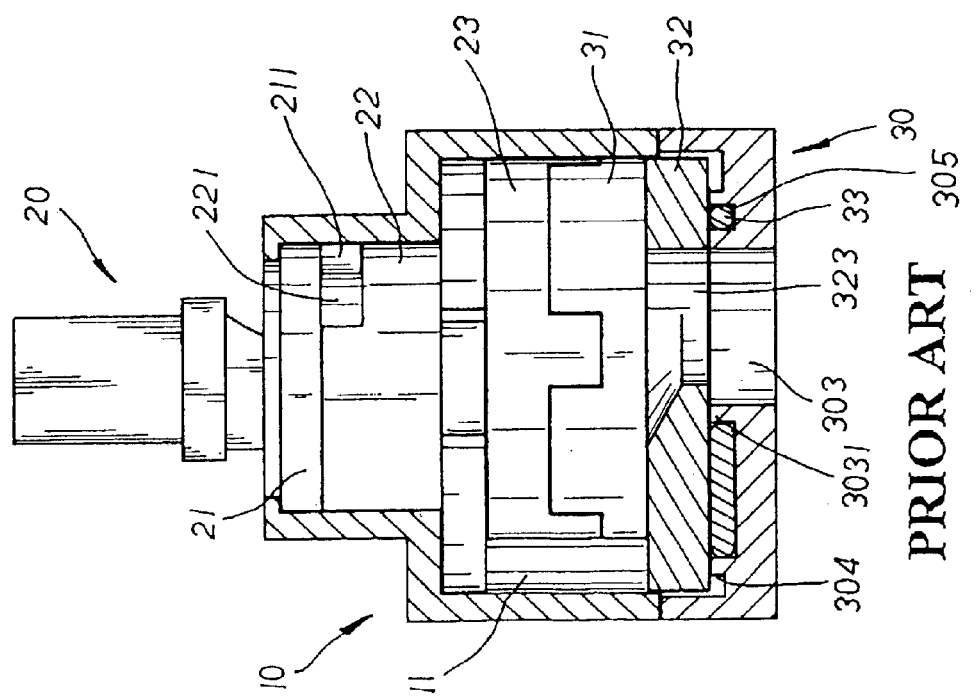
FIG. 2 is a sectional view of a conventional ceramic core shaft of a singled handle faucet in assembly.

Please refer to FIG. 4. In assembly, the lower switch valve 42 is applied onto the valve mount 40 with the hot/cold water inlet holes 421, 422 and the water outlet hole 423 thereof overlapping on top of the hot/cold water inlet passages 401, 402 and the water outlet passage 403 thereof respectively, and the indented groove seats 4211, 4221, 4231, of the hot/cold water inlet holes and water outlet hole 421, 422, 423 thereof securely joined to the higher protruded walls 4011, 4021, 4031, of the hot/cold water inlet passages and water outlet passage 401, 402, 403 thereof in sealing engagement. Meanwhile, the sealing ring 43 is further pressed downwards to be securely adapted at the channel groove 405 of the valve mount 40 therein, preventing the leakage of water in use and ensuring the precise engagement of the lower switch valve 42, with the valve mount 40 thereof.

What is claimed is:

1. A hot/cold water inlet and outlet structure for a ceramic core shaft of a single handled faucet, comprising a valve housing, a switch valve set, a valve mount, an upper switch valve, a lower switch valve, and a sealing ring wherein the valve housing has a valve chamber disposed at the interior thereof for the switch valve set and the valve mount thereof to be adapted therein respectively; the present invention being characterized by that, the switch valve set being made up of a control stick seat with a turning protruded block disposed at the upper section thereof, a support seat with a turning cut area disposed beneath the control stick seat thereof, and a switch valve disposed at the bottom thereof correspondingly matched to the valve mount thereof;

the upper switch valve having a regulating recess defined at the bottom thereof;

the lower switch valve having a pair of arc hot/cold water inlet holes and a water outlet hole disposed thereon, correspondingly matched to arc hot/cold water inlet passages and a water outlet passage of the valve mount thereof wherein the periphery of the arc hot/cold water inlet holes and the water outlet hole thereof are defined by indented groove seats respectively, correspondingly matched to higher protruded walls defining the arc hot/cold water inlet passages and the water outlet passage of the valve mount thereof respectively; the higher protruded walls thereof being further circumscribed by a lower stop wall extending upwards at the outside thereof to form a channel groove therein for the sealing ring of the same shape to be adapted therein;

whereby, the lower switch valve is applied onto the valve mount with the hot/cold water inlet holes and water outlet hole thereof overlapping on top of the hot/cold water inlet passages and the water outlet passage thereof respectively, and the indented groove seats thereof securely joined to the higher protruded walls thereof in sealing engagement, further pressing downwards the sealing ring to be securely adapted at the channel groove of the valve mount so as to effectively prevent the leakage of water in use and ensure the precise engagement of the lower switch valve with the valve mount thereof.

* * * * *